United States Patent [19]

Leising et al.

[11] Patent Number: 4,965,728

[45] Date of Patent: Oct. 23, 1990

[54] METHOD OF ADAPTIVELY IDLING AN ELECTRONIC AUTOMATIC TRANSMISSION SYSTEM

[75] Inventors: Maurice B. Leising, Clawson; Howard L. Benford, Bloomfield Hills; Michael R. Lindsay, Livonia; Jay C. McCombie, Rochester Hills, all of Mich.

[73] Assignee: Chrysler Corporation, Highland Park, Mich.

[21] Appl. No.: 188,617

[22] Filed: Apr. 29, 1988

[51] Int. Cl.[5] .................. B60K 41/02; F16H 5/58
[52] U.S. Cl. .................. 364/424.1; 74/866; 74/877; 192/0.076
[58] Field of Search .............. 364/424.1; 74/866, 869, 74/877; 192/0.052, 0.076

[56] References Cited

U.S. PATENT DOCUMENTS

| | | | |
|---|---|---|---|
| 3,876,028 | 4/1975 | Asano et al. | 74/866 |
| 3,881,368 | 5/1975 | Furuhashi et al. | 74/866 |
| 3,942,333 | 3/1976 | Forster et al. | 74/866 |
| 3,956,947 | 5/1976 | Leising et al. | 74/866 |
| 4,044,634 | 8/1977 | Florus et al. | 74/866 |
| 4,073,204 | 2/1978 | Dick | 74/866 |
| 4,082,013 | 4/1978 | Dornfeld et al. | 74/866 |
| 4,131,036 | 12/1978 | Ivey et al. | 74/866 |
| 4,174,645 | 11/1979 | Ohmae et al. | 74/866 |
| 4,208,925 | 6/1980 | Miller et al. | 74/866 |
| 4,220,058 | 9/1980 | Petzold | 74/866 |
| 4,224,842 | 9/1980 | Rabus et al. | 74/866 |
| 4,244,244 | 1/1981 | Rembold et al. | 74/866 |
| 4,258,591 | 3/1981 | Eckert et al. | 74/866 |
| 4,259,882 | 4/1981 | Miller | 74/866 |
| 4,283,970 | 8/1981 | Vukovich | 74/866 |
| 4,380,048 | 4/1983 | Kishi et al. | 364/424.1 |
| 4,468,988 | 9/1984 | Hiramatsu | 74/868 |
| 4,468,989 | 9/1984 | Rosen | 74/868 |
| 4,485,443 | 11/1984 | Knodler et al. | 364/424.1 |
| 4,503,734 | 3/1985 | Acker | 74/866 |
| 4,527,678 | 7/1985 | Pierce et al. | 74/866 |
| 4,535,412 | 8/1985 | Cederquist | 364/424.1 |
| 4,584,906 | 4/1986 | Nagaoka et al. | 74/866 |
| 4,618,043 | 10/1986 | Hattori et al. | 192/0.052 |
| 4,631,628 | 12/1986 | Kissel | 123/490 |
| 4,632,231 | 12/1986 | Hattori et al. | 192/0.076 |
| 4,660,442 | 4/1987 | Nishikawa et al. | 74/869 |
| 4,667,540 | 5/1987 | Yagi | 74/866 |
| 4,680,988 | 7/1987 | Mori | 74/866 |
| 4,693,142 | 9/1987 | Kurihara et al. | 74/866 |
| 4,707,789 | 11/1987 | Downs et al. | 364/424.1 |
| 4,714,145 | 12/1987 | Kurihara et al. | 192/0.052 |
| 4,807,132 | 2/1989 | Arai et al. | 364/424.1 |

OTHER PUBLICATIONS

Takeo Hiramatsu, et al., "Control Technology of Minimal Slip-Type Torque Converter Clutch," SAE Technical Paper 850460 (1985).

M. Suga, et al., "The Control of the Lockup Clutch Used in the Microprocessor Controlled Automatic Transmission," 1 Mech. E. (1985).

*Primary Examiner*—Felix D. Gruber
*Attorney, Agent, or Firm*—Mark P. Calcaterra

[57] ABSTRACT

A method of adaptively idling a transmission in an electronic automatic transmission system putting the transmission to "neutral" when the engine is idling and the brakes are applied.

14 Claims, 2 Drawing Sheets

METHOD OF ADAPTIVELY IDLING AN ELECTRONIC AUTOMATIC TRANSMISSION SYSTEM

BACKGROUND OF THE INVENTION

1. Field Of The Invention

The present invention relates to an automatic transmission primarily intended for motor vehicle use and more particularly, to a method of "adaptively" idling a transmission that is controlled electronically and hydraulically by placing the transmission in a neutral operating mode when the engine of the motor vehicle is idling.

2. Description Of Related Art

Generally speaking land vehicles require three basic components. These components comprise a power plant (such as an internal combustion engine) a power train and wheels. The internal combustion engine produces force by the conversion of the chemical energy in a liquid fuel into the mechanical energy of motion (kinetic energy). The function of the power train is to transmit this resultant force to the wheels to provide movement of the vehicle.

The power train's main component is typically referred to as the "transmission". Engine torque and speed are converted in the transmission in accordance with the tractive-power demand of the vehicle. The vehicle's transmission is also capable of controlling the direction of rotation being applied to the wheels so that the vehicle may be driven both forward and backward.

A conventional transmission includes a hydrodynamic torque converter to transfer engine torque from the engine crankshaft to a rotatable input member of the transmission through fluid-flow forces. The transmission also includes frictional units which couple the rotating input member to one or more members of a planetary gearset. Other frictional units, typically referred to as brakes, hold members of the planetary gearset stationary during flow of power. These frictional units are usually brake clutch assemblies or band brakes. The drive clutch assemblies can couple the rotating input member of the transmission to the desired elements of the planetary gearsets, while the brakes hold elements of these gearsets stationary. Such transmission systems also typically provide for one or more planetary gearsets in order to provide various ratios of torque and to ensure that the available torque and the respective tractive power demand are matched to each other.

Transmissions are generally referred to as manually actuated or automatic transmissions. Manual transmissions generally include mechanical mechanisms for coupling rotating gears to produce different ratio outputs to the drive wheels.

Automatic transmissions are designed to take automatic control of the frictional units, gear ratio selection and gear shifting. A thorough description of general automatic transmission design principals may be found in "Fundamentals of Automatic Transmissions and Transaxles," Chrysler Corporation Training Manual No. TM-508A. Additional descriptions of automatic transmissions may be found in U.S. Pat. No. 3,631,744, entitled "Hydromatic Transmission," issued Jan. 4, 1972 to Blomquist, et al., and U.S. Pat. No. 4,289,048, entitled "Lock-up System for Torque Converter," issued on Sept. 15, 1981 to Mikel, et al. Each of these patents is hereby incorporated by reference.

In general, the major components featured in such an automatic transmission are: a torque converter as above-mentioned; fluid pressure-operated multi-plate drive or brake clutches and/or brake bands which are connected to the individual elements of the planetary gearsets in order to perform gear shifts without interrupting the tractive power; one-way clutches in conjunction with the frictional units for optimization of power shifts; and transmission controls such as valves for applying and releasing elements to shift the gears (instant of shifting), for enabling power shifting, and for choosing the proper gear (shift point control), dependent on shift-program selection by the driver (selector lever), accelerator position, the engine condition and vehicle speed.

The control system of the automatic transmission is typically hydraulically operated through the use of several valves to direct and regulate the supply of pressure. This hydraulic pressure control will cause either the actuation or deactuation of the respective frictional units for effecting gear changes in the transmission. The valves used in the hydraulic control circuit typically comprise spring-biased spool valves, spring-biased accumulators and ball check valves. Since many of these valves rely upon springs to provide a predetermined amount of force, it will be appreciated that each transmission design represents a finely tuned arrangement of interdependent valve components. While this type of transmission control system has worked well over the years, it does have its limitations. For example, such hydraulically controlled transmissions are generally limited to one or a very small number of engines and vehicle designs. Therefore, considerable cost is incurred by an automobile manufacturer to design, test, build, inventory and repair several different transmission units in order to provide an acceptable broad model line for consumers.

Additionally, it should be appreciated that such hydraulically controlled transmission systems cannot readily adjust themselves in the field to compensate for varying conditions such as normal wear on the components, temperature swings and changes in engine performance over time. While each transmission is designed to operate most efficiently within certain specific tolerances, typical hydraulic control systems are incapable of taking self-corrective action on their own to maintain operation of the transmission at peak efficiency.

However, in recent years, a more advanced form of transmission control system has been proposed, which would offer the possibility of enabling the transmission to adapt itself to changing conditions. In this regard, U.S. Pat. No. 3,956,947, issued on May 18, 1976 to Leising, et al., which is hereby incorporated by reference, sets forth a fundamental development in this field. Specifically, this patent discloses an automatic transmission design which features an "adaptive" control system that includes electrically operated solenoid-actuated valves for controlling certain fluid pressures. In accordance with this electric/hydraulic control system, the automatic transmission would be "responsive" to an acceleration factor for controlling the output torque of the transmission during a shift from one ratio of rotation (between the input and output shafts of the transmission) to another. Specifically, the operation of the solenoid-actuated valves would cause a rotational speed versus time curve of a sensed rotational component of the transmission to substantially follow along a predetermined path during shifting.

3. Objects Of The Present Invention

It is one of the principal objects of the present invention to provide a significantly advanced electronically controlled transmission which is fully adaptive. By fully adaptive, it is meant that substantially all shifts are made using closed-loop control (i.e. control based on feedback). In particular, the control is closed loop on speed, speed ratio, or slip speed of either $N_t$ (turbine of the torque converter) and $N_e$ (engine) or a combination of $N_t$ and $N_o$ (output) which will provide the speed ratio or slip speed This transmission control is also capable of "learning" from past experience and making appropriate adjustments on that basis.

Another object of the present invention is to provide an automatic transmission in which the shift quality is maintained approximately uniform regardless of the engine size, within engine performance variations or component condition (i.e. the transmission control system will adapt to changes in engine performance or in the condition of the various frictional units of the transmission.).

It is a more specific object of the present invention to provide a method of adaptively placing an automatic transmission in a neutral gear operating mode when the vehicle is stopped and the engine is idling.

This application is one of several applications filed on the same date, all commonly assigned and having similar Specification and Drawings, these applications being identified below.

| U.S. Serial No. | Patent No. | Title |
|---|---|---|
| 187,772 | 4,875,391 | An electronically-controlled, adaptive automatic transmission system |
| 187,751 | | Automatic four-speed transmission |
| 189,493 | 4,915,204 | Push/pull clutch apply piston of an automatic transmission |
| 187,781 | | Shared reaction plates between clutch assemblies in an automatic transmission |
| 187,492 | | Clutch reaction and pressure plates in an automatic transmission |
| 188,602 | | Bleeder ball check valves in an automatic transmission |
| 188,610 | | Pressure balanced pistons in an automatic transmission |
| 189,494 | | Double-acting spring in an automatic transmission |
| 188,613 | 4,907,681 | Park locking mechanism for an automatic transmission |
| 187,770 | 4,887,491 | Solenoid-actuated valve arrangement of an automatic transmission system |
| 188,796 | | Reciprocating valves in a fluid system of an automatic transmission |
| 187,705 | 4,887,512 | Vent reservoir in a fluid system of an automatic transmission |
| 188,592 | | Fluid actuated switch valve in an automatic transmission |
| 188,598 | 4,893,652 | Direct-acting, non-close clearance solenoid-actuated valves |
| 188,618 | | Noise control device for a solenoid-actuated valve |
| 188,605 | 4,871,887 | Fluid actuated pressure switch for an automatic transmission |
| 187,210 | | Method of applying reverse gear of an automatic transmission |
| 187,672 | | Torque converter control valve in a fluid system of an automatic transmission |
| 187,120 | | Cam-controlled manual valve in an automatic transmission |
| 187,181 | 4,907,475 | Fluid switching manually between valves in an automatic transmission |
| 187,704 | | Method of operating an electronic automatic transmission system |
| 188,020 | | Method of shift selection in an electronic automatic transmission system |
| 187,991 | | Method of universally organizing shifts for an electronic automatic transmission system |
| 188,603 | | Method of determining and controlling the lock-up of a torque converter in an electronic automatic transmission system |
| 189,553 | | Method of determining the driver selected operating mode of an automatic transmission system |
| 188,615 | | Method of determining the shift lever position of an electronic automatic transmission system |
| 188,594 | | Method of determining the acceleration of a turbine in an automatic transmission |
| 187,771 | | Method of determining the fluid temperature of an electronic automatic transmission system |
| 188,607 | | Method of determining the continuity of solenoids in an electronic automatic transmission system |
| 189,579 | | Method of determining the throttle angle position for an electronic automatic transmission system |
| 188,604 | 4,905,545 | Method of controlling the speed change of a kickdown shift for an electronic automatic transmission system |
| 188,591 | | Method of controlling the apply element during a kickdown shift for electronic automatic transmission system |
| 188,608 | | Method of calculating torque for an electronic automatic transmission system |
| 187,150 | | Method of learning for adaptively controlling an electronic automatic transmission system |
| 188,595 | | Method of accumulator control for a friction element in an electronic automatic transmission system |
| 188,599 | | Method of adaptively scheduling a shift for an electronic automatic transmission system |
| 188,601 | | Method of shift control during a coastdown shift for an electronic automatic transmission system |
| 188,620 | | Method of torque phase shift control for an electronic automatic transmission |
| 188,596 | | Method of diagnostic protection for an electronic automatic transmission system |
| 188,597 | | Method of stall torque management for an electronic automatic transmission system |
| 188,606 | | Method of shift torque management for an electronic automatic transmission system |
| 188,616 | | Electronic controller for an automatic transmission |
| 188,600 | | Dual regulator for reducing system current during at least one mode of operation |
| 188,619 | | Utilization of a reset output of a regulator as a system low-voltage inhibit |
| 188,593 | | The use of diodes in an input circuit to take advantage of an active pull-down network provided in a dual regulator |
| 188,609 | | Shutdown relay driver circuit |
| 188,614 | | Circuit for determining the crank position of an ignition switch by sensing the voltage across the starter relay control and holding an electronic device in a reset condition in response thereto |
| 188,612 | 4,901,561 | Throttle position sensor data shared between controller with dissimilar grounds |
| 188,611 | | Neutral start switch to sense shift lever position |
| 188,981 | | Open loop control of solenoid coil driver |

Commonly assigned application Ser. No. 07/187,772, filed Apr. 29, 1988, now U.S. Pat. No. 4,875,391 has been printed in its entirety. The Figures and the entire Specification of that application are specifically incorporated by reference. For a description of the above copending applications, reference is made to the above mentioned U.S. Pat. No. 4,875,391.

SUMMARY OF THE INVENTION

To achieve the foregoing objects, the present invention provides a comprehensive four-speed automatic transmission system. While this transmission system particularly features a fully adaptive electronic control system, numerous other important advances are incorporated into this unique transmission system, as will be described below in detail.

The transmission control system includes a microcomputer-based controller which receives input signals indicative of engine speed, turbine speed, output speed (vehicle speed), throttle angle position, brake application, predetermined hydraulic pressure, the driver selected gear or operating condition (PRNODDL), engine coolant temperature, and/or ambient temperature. This controller generates command or control signals for causing the actuation of a plurality of solenoid. actuated valves which regulate the application and release of pressure to and from the frictional units of the transmission system. Accordingly, the controller will execute predetermined shift schedules stored in the memory of the controller through appropriate command signals to the solenoid-actuated valves and the feedback which is provided by various input signals.

Another primary feature of the present invention is to provide an adaptive system based on closed-loop control. In other words, the adaptive control system performs its functions based on real-time feedback sensor information, i.e., the system takes an action which affects the output, reads the effect, and adjusts the action continuously in real-time. This is particularly advantageous because the control actuations can be corrected as opposed to an open loop control in which signals to various elements are processed in accordance with a predetermined program.

Another feature of the transmission control system includes the ability to provide an adaptive-idle mode of operation which may achieve significant gains in fuel economy. That is, the adaptive-idle mode effectively puts the transmission in "neutral" when the engine is idling and the brakes are applied.

BRIEF DESCRIPTION OF THE DRAWINGS

Other objects, features and advantages of the present invention will become more fully apparent from the following detailed description of the preferred embodiment, the appended claims and in the accompanying drawings in which:

FIGS. 18A-C illustrate the adaptive idle methodology according to the present invention;

FIG. 18A is a flow chart of the adaptive idle methodology;

FIG. 18B is a graph of the cycle time of one solenoid-actuated valve; and

FIG. 18C is a graph of speed versus time for the turbine of the torque converter.

At diamond 1708, the transmission controller 3010 determines whether adaptive idle is in an adaptive idle "exit" mode (FIG. 18C) by looking for a flag or performing calculations of speed for example. If not, the methodology advances to diamond 1710 and determines whether the adaptive idle conditions previously described are true by looking for a flag of block 1704. If the adaptive idle conditions are not true, the methodology advances to block 1712 and turns ON or applies the underdrive clutch 302. The methodology then returns through bubble 1714.

Figure 18A:
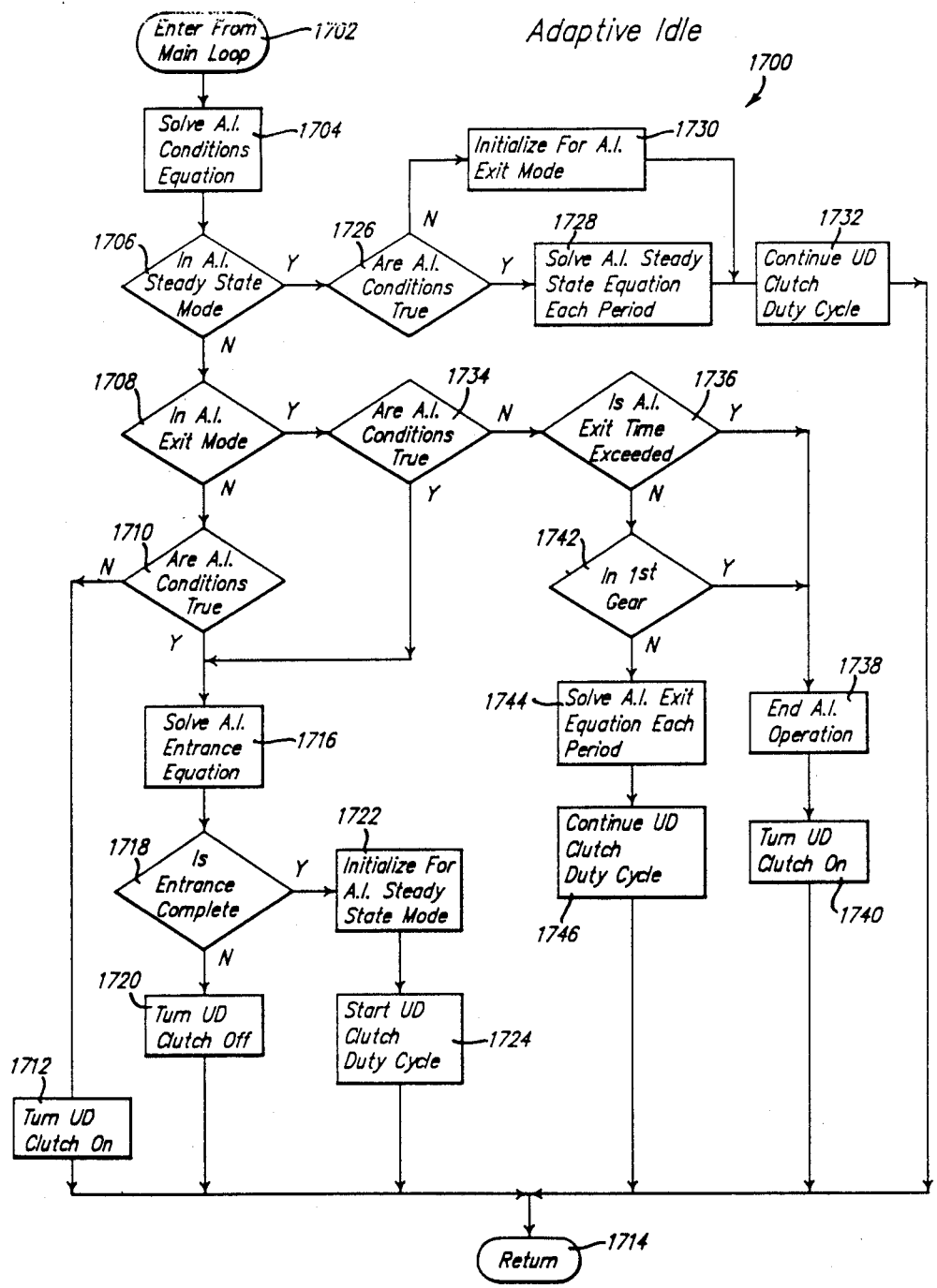
Figure 1B:
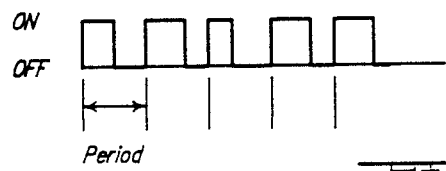
Figure 1C:
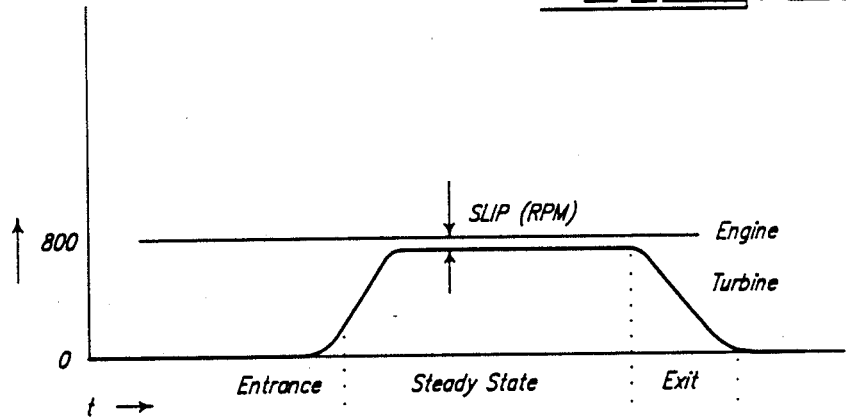

At diamond 1710, if the adaptive idle conditions are true, the methodology advances to block 1716 to solve the adaptive idle entrance equation, representing part of the curve illustrated in FIG. 18C. The adaptive idle entrance equation may be defined as follows:

$T(i)=0$ until [$N_t(i)$ is greater than first gear $N_t$ plus 50 r.p.m.] and [$N_t(i)$ is greater than 100 r.p.m.], then $T(i)=7700$ for one cycle In the above equations, T(i) is the calculated ON time of the underdrive clutch solenoid-actuated valve 630 at the start of each cycle, and $N_t(i)$ is the current turbine speed. The underdrive clutch 302 is kept fully OFF (i.e. $T(i)=0$) until adaptive idle conditions are met. The methodology advances to diamond 1718 and determines whether the entrance into adaptive idle is complete by looking for a flag or performing calculations of speed for example. If the entrance is not complete, the methodology advances to block 1720 and turns OFF or disengages the underdrive clutch 302. If the entrance is complete, the methodology advances to block 1722 and initializes predetermined variables such as the percent ON time (i.e. $T(i)=7700$ for one cycle) for adaptive idle steady state mode. The methodology advances to block 1724 and starts the duty cycle of the solenoid-actuated valve 630 for the underdrive clutch 302. The methodology then returns through bubble 1714.

At diamond 1706, if the transmission 100 is in the adaptive idle steady state mode, the methodology advances to diamond 1726 and determines whether the adaptive idle conditions previously described in block 1704 are true by looking for a flag. If the adaptive idle conditions are true, the methodology advances to block 1728 and solves the adaptive idle steady state equation each predetermined time period of the duty cycle (See FIG. 18B). The steady state equation may be defined as follows:

$T(i)=T(i-1)+36$ [$N_t(i)-N_t(i-1)$]$-24$[$N_t(i-1)-N_t(i-2)$]$+4$ [$N_t(i) -N_d$] where:

$T(i-1)=$previous cycle ON time for the solenoid of the solenoid-actuated valve; and $N_d=$desired turbine speed.

If the adaptive idle conditions are not true, the methodology advances to block 1730 and initializes predetermined variables previously described for the adaptive idle exit mode, representing part of the curve illustrated in FIG. 18C. The exit equation may be initialized as follows:

$T(i)=T_{AI}+8400$ until ($\alpha_t$ is less than $-500$), then $T(i)=0.8T_{AI}+2240$ for one cycle, where:

$T_{AI}=$last T(i) in adaptive idle before adaptive idle exit The methodology advances from block 1728 and 1730 to block 1732 and continues the duty cycle for the underdrive clutch 302 the methodology then returns through bubble 1714.

At diamond 1708, if the transmission 100 is in the adaptive idle exit mode, the methodology advances to diamond 1734 and determines whether the adaptive idle conditions in block 1704 previously described are true by looking for a flag. If the adaptive idle conditions are true, the methodology advances to block 1716 previously described to solve the adaptive idle entrance equation. If the adaptive idle conditions are not true, the methodology advances to diamond 1736 and determines whether a predetermined adaptive idle exit time has been exceeded by looking at a timer. If the adaptive idle exit time has been exceeded, the methodology advances to block 1738 and ends adaptive idle operation. The methodology advances to block 1740 and turns ON or applies the underdrive clutch 302. The methodology then returns through bubble 1714.

At diamond 1736, if the adaptive idle exit time has not been exceeded, the methodology advances to diaxond 1742 and determines whether the transmission 100 is presently in first gear by looking at speed ratios of $N_t$ to $N_o$. If the transmission 100 is presently in first gear, the methodology advances to block 1738 previously described to end adaptive idle operation. If the transmission 100 is not presently in first gear, the methodology advances to block 1744 and solves the adaptive idle exit equation each time period of the duty cycle. The exit equation may be defined as follows:

$T(i) = T(i-1) + 52 \quad [N_t(i) - N_t(i-1)] - 34 [N_t(i-1) - N_t(i-2)] + 700 + 14 \quad Thr(i) + 258 [Thr(i) - Thr(i-1)]$, where:

Thr(i) = current throttle angle The methodology advances to block 1746 and continues the duty cycle of the solenoid-actuated valve 630 for the underdrive clutch 302. The methodology then returns.

The present invention has been described in an illustrative manner. It is to be understood that the terminology which has been used is intended to be in the nature of words of description rather than of limitation.

Obviously, many modifications and variations are possible in light of the above teachings. Therefore, the subject invention may be practiced otherwise than as specifically described.

What is claimed is:

1. In a vehicle having an engine and a transmission system including an input member, an output member, a torque converter assembly for transmitting torque between an engine and the input member, a gear assembly for changing the ratio of torque between the input member and output member, a plurality of friction elements for shifting the gear assembly, a fluid actuating device being movable axially for applying at least one friction element, at least one solenoid-actuated valve being movable in response to the presence or absence of electrical power to the valve for directing fluid flow between a fluid source and the fluid actuating device, sensors providing signals indicative of measurement data for predetermined conditions, a controller with memory for processing and storing the signals and predetermined values and providing output signals to control the solenoid-actuated valves, a method of placing a vehicle transmission in a neutral operating mode when the vehicle is substantially stationary and the engine is idling, said method comprising the step of:

reading a plurality of sensors by the controller to provide measurement data of predetermined conditions;

solving a first predetermined equation based on the measurement data of the predetermined conditions to determine whether the transmission can be placed in a substantially neutral operating mode when the engine of the vehicle is idling;

determining whether the transmission can be placed in a substantially neutral operating mode based on the solved first predetermined equation; and operating the transmission in a substantially neutral operating mode if determined that the transmission can be placed in a substantially neutral operating mode.

2. A method as set forth in claim 1 including the step of determining whether the transmission is in a steady state mode of the substantially neutral operating mode based on the first predetermined equation.

3. A method as set forth in claim 1 including the step of determining whether the transmission is exiting the substantially neutral operating mode if the transmission is not in a steady state mode.

4. A method as set forth in claim 1 including the steps of determining whether predetermined conditions for placing the transmission in the substantially neutral operating mode are true if the transmission is not in the exit mode;

engaging fully a friction element to place the transmission in a first gear operating mode if the predetermined conditions are not true;

solving a second predetermined equation to place the transmission in a substantially neutral gear operating mode if the predetermined conditions are true;

determining whether the transmission has been placed in the substantially neutral operation mode;

disengaging the friction element fully if the transmission has been placed in the substantially neutral operating mode;

initializing predetermined values for cycling the friction element to operate the transmission in the substantially neutral operating mode; and starting a duty cycle to partially engage and disengage the friction element to allow a predetermined difference between the speed of the input member and output member.

5. A method as set forth in claim 1 including the steps of solving a predetermined steady state equation for the steady state mode each period of the duty cycle if the predetermined conditions are true; and initializing predetermined values for exiting the substantially neutral operating mode if the predetermined conditions are not true.

6. A method as set forth in claim 5 including the step of continuing the duty cycle for the friction element.

7. A method as set forth in claim 3 including the step of determining whether the predetermined conditions are true if the transmission is exiting the substantially neutral operating mode.

8. A method as set forth in claim 7 including the step of determining whether a predetermined time period has been exceeded in exiting the substantially neutral operating mode.

9. A method as set forth in claim 8 including the steps of ending the operation if the predetermined time period has been exceeded in exiting the substantially neutral operating mode and engaging fully the friction element.

10. A method as set forth in claim 8 including the step of determining whether the transmission is presently in first gear operating mode by comparing speeds from signals provided by the sensors.

11. A method as set forth in claim 10 including the step of solving a predetermined exit equation for each period of the duty cycle.

12. A method as set forth in claim 11 including the steps of continuing the duty cycle for the friction element.

13. In a vehicle having an engine and a transmission system including an input member, an output member, a torque converter assembly for transmitting torque between an engine and the input member, a gear assembly for changing the ratio of torque between the input member and output member, a plurality of friction elements for shifting the gear assembly, a fluid actuating device being movable axially for applying at least one friction element at least one solenoid-actuated valve being movable in response to the presence or absence of electrical power to the valve for directing fluid flow between a fluid source and the fluid actuating device, in-put sensors providing input signals indicative of predetermined conditions, a controller with memory for processing and storing the signals and predetermined values and providing output signals to control the solenoid-actuated valves, a method of placing a vehicle transmission in a neutral operating mode when the vehicle is substantially stationary and the engine is idling, said method comprising the steps of:

reading a plurality of input sensors by the controller to determine whether the transmission can be placed in a substantially neutral operating mode when the engine of the vehicle is idling;

checking the difference between the speed of the engine and the turbine to determine whether the transmission is in a steady state mode of the substantially neutral operating mode by;

determining whether the transmission is exiting the substantially neutral operating mode if the transmission is not in a steady state mode;

determining whether predetermined conditions for placing the transmission in the substantially neutral operating mode are true if the transmission is in the steady state mode;

actuating the piston to engage fully a clutch assembly to place the transmission in a first gear operating mode if the predetermined conditions are not true;

solving a predetermined equation to place the transmission in a substantially neutral gear operating mode if the predetermined conditions are true;

determining whether the transmission has been placed in the substantially neutral operation mode;

disengaging the clutch assembly fully if the transmission has been placed in the substantially neutral operating mode;

initializing predetermined values for the presence and absence of electrical power to the solenoid-actuated valves for duty cycling the piston to engage and disengage the clutch assembly to operate the transmission in the substantially neutral operating mode;

duty cycling the piston to partially engage and disengage the first clutch assembly to allow a predetermined difference between the speed of the input member and the output member;

solving a predetermined steady state equation for the steady state mode each duty cycle if the predetermined conditions are true;

initializing predetermined values for the presence and absence of electrical power to the solenoid-actuated valves for exiting the substantially neutral operating mode if the predetermined conditions are not true;

continuing duty cycling the clutch assembly;

determining whether the predetermined conditions are true if the transmission is exiting the substantially neutral operating mode;

determining whether a predetermined time period has been exceeded in exiting the substantially neutral operating mode;

ending duty cycling if the predetermined time period has been exceeded in exiting the substantially neutral operating mode;

applying fully the piston to completely engage the clutch assembly;

determining whether the transmission is presently in first gear operating mode;

solving a predetermined exit equation for each duty cycle; and continuing duty cycling the clutch assembly.

14. In a vehicle having an engine and a transmission system including an input member, an output member, a torque converter assembly for transmitting torque between an engine and the input member, a gear assembly for changing the ratio of torque between the input member and output member, a plurality of friction elements for shifting the gear assembly, a fluid actuating device being movable axially for applying at least one friction element, at least one solenoid-actuated valve being moved in response to the presence or absence of electrical power to the valve for directing fluid flow between a fluid source and the fluid actuating device, sensors providing signals indicative of measurement data for predetermined conditions, a controller with memory for processing and storing the signals and predetermined values and providing output signals to control the solenoid-actuated valves, a method of placing a vehicle transmission in a neutral operating mode when the vehicle is substantially stationary and the engine is idling, said method comprising the step of:

reading a plurality of sensors by the controller to determine whether the transmission can be placed in a substantially neutral operating mode when the engine of the vehicle is idling;

checking the difference between the speed of the engine and the turbine to determine whether the transmission is in a steady state mode of the substantially neutral operating mode;

determining whether the transmission is exiting the substantially neutral operating mode if the transmission is not in a steady state mode;

determining whether predetermined conditions for placing the transmission in the substantially neutral operating mode are true if the transmission is in the steady mode;

actuating the piston to engage fully a clutch assembly to place the transmission in a first gear operating mode if the predetermined conditions are not true;

solving a predetermined equation to place the transmission in a substantially neutral gear operating mode if the predetermined conditions a true;

determining whether the transmission has been placed in the substantially neutral operation mode; and disengaging the clutch assembly fully if the transmission has been placed in the substantially neutral operating mode.

* * * * *